United States Patent [19]
Rea et al.

[11] Patent Number: 5,462,313
[45] Date of Patent: Oct. 31, 1995

[54] QUICK CONNECT COUPLING

[75] Inventors: Perry J. Rea, Bloomfield Hills; Michael R. Miller, Rochester Hills; Gary T. Iler, Rochester; William E. Stevens, Ypsilanti, all of Mich.

[73] Assignee: Form Rite Corporation, Auburn Hills, Mich.

[21] Appl. No.: 176,243

[22] Filed: Jan. 3, 1994

Related U.S. Application Data

[63] Continuation-in-part of Ser. No. 142,764, Oct. 26, 1993.

[51] Int. Cl.$^6$ ................................. F16L 21/08
[52] U.S. Cl. ................. 285/21; 285/319; 285/379; 285/423; 285/921; 285/910; 156/158
[58] Field of Search ......................... 285/319, 921, 285/910, 374, 231, 53, 379, 423, 110, 21, 379; 156/158

[56] References Cited

U.S. PATENT DOCUMENTS

| | | | |
|---|---|---|---|
| 1,029,715 | 6/1912 | Robinson | 285/910 X |
| 3,312,483 | 4/1967 | Leadbetter et al. | 285/423 X |
| 3,413,021 | 11/1968 | Potts | 285/319 |
| 3,450,424 | 12/1968 | Calisher | 285/305 |
| 3,569,903 | 3/1971 | Brishka | 339/74 |
| 3,583,731 | 6/1971 | Jewell | 285/85 |
| 3,584,902 | 6/1971 | Vyse | 285/305 |
| 3,588,149 | 6/1971 | Demleri, Sr. et al. | 285/110 |
| 3,601,361 | 8/1971 | Hundhausen et al. | 251/149.1 |
| 3,711,125 | 1/1973 | Dehar | 285/111 |
| 3,826,523 | 7/1974 | Eschbaugh | 285/39 |
| 3,839,093 | 10/1974 | Twogood et al. | 136/135 |
| 3,888,523 | 6/1975 | Bartholomew | 285/382 |
| 3,997,195 | 12/1976 | Bartholomew | 285/81 |
| 4,006,922 | 2/1977 | Bartholomew | 285/39 |
| 4,173,362 | 11/1979 | Glover et al. | 285/379 X |
| 4,310,185 | 1/1982 | Bartholomew | 285/369 |
| 4,423,892 | 1/1984 | Bartholomew | 285/319 |
| 4,524,995 | 6/1985 | Bartholomew | 285/54 |
| 4,526,411 | 7/1985 | Bartholomew | 285/305 |
| 4,541,658 | 9/1985 | Bartholomew | 285/319 |
| 4,601,497 | 7/1986 | Bartholomew | 285/319 |
| 4,669,757 | 6/1987 | Bartholomew | 285/55 |
| 4,681,351 | 7/1987 | Bartholomew | 285/319 |
| 4,743,051 | 5/1988 | Proni | 285/319 |
| 4,749,214 | 6/1988 | Hoskins et al. | 285/379 X |
| 4,778,203 | 10/1988 | Bartholomew | 285/111 |
| 4,790,569 | 12/1988 | Chaffee | 285/40 |
| 4,869,534 | 9/1989 | Ketcham et al. | 285/24 |
| 4,915,136 | 4/1990 | Bartholomew | 138/89 |
| 4,925,217 | 5/1990 | Ketcham | 285/93 |
| 4,927,185 | 5/1990 | McNaughton | 285/39 |
| 4,936,544 | 6/1990 | Bartholomew | 251/149 |
| 4,943,091 | 7/1990 | Bartholomew | 285/12 |
| 4,944,536 | 7/1990 | Bartholomew | 285/319 |
| 4,948,175 | 8/1990 | Bartholomew | 285/39 |
| 4,948,176 | 8/1990 | Bartholomew | 285/93 |
| 4,979,765 | 12/1990 | Bartholomew | 285/93 |
| 4,981,586 | 1/1991 | Bartholomew | 210/435 |
| 4,984,831 | 1/1991 | Bengtsson | 285/110 X |
| 5,000,614 | 3/1991 | Walker et al. | 403/326 |
| 5,002,315 | 3/1991 | Bartholomew | 285/93 |
| 5,009,454 | 4/1991 | Bartholomew | 285/24 |

(List continued on next page.)

FOREIGN PATENT DOCUMENTS 2032560  5/1980  United Kingdom .................. 285/319

*Primary Examiner*—Dave W. Arola
*Attorney, Agent, or Firm*—Young, MacFarlane & Wood

[57] ABSTRACT

A quick connect coupling for tubing. The coupling includes a tubular male connector member adapted to be telescopically received within a tubular female connector member. The female connector member includes a tubular housing and a tubular retainer cap which is permanently bonded to the housing utilizing a sonic welding technique and which defines prong portions for latching coaction with an annular bead on the male member. The coupling further includes a unitary elastomeric seal positioned in a bore of the female member housing and defining a series of axially spaced, radially inwardly extending seal ribs slidably and sealingly engaging the outer circumferential surface of the male connector member.

25 Claims, 5 Drawing Sheets

U.S. PATENT DOCUMENTS

| | | | |
|---|---|---|---|
| 5,031,941 | 7/1991 | Bartholomew | 285/91 |
| 5,033,513 | 7/1991 | Bartholomew | 138/109 |
| 5,052,723 | 10/1991 | Bartholomew | 285/108 |
| 5,063,968 | 11/1991 | Bartholomew | 138/109 |
| 5,067,754 | 11/1991 | Bartholomew | 285/319 |
| 5,069,489 | 12/1991 | Bartholomew | 285/319 |
| 5,125,431 | 6/1992 | Vogel et al. | 285/21 X |
| 5,285,776 | 2/1994 | Bertram | 285/319 X |

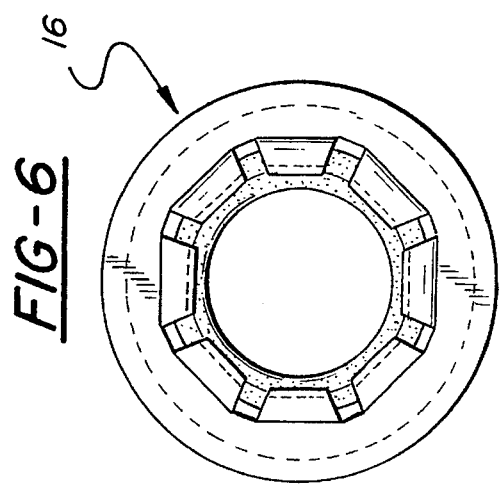
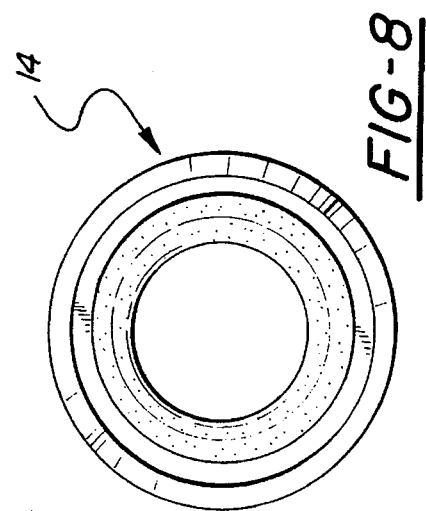
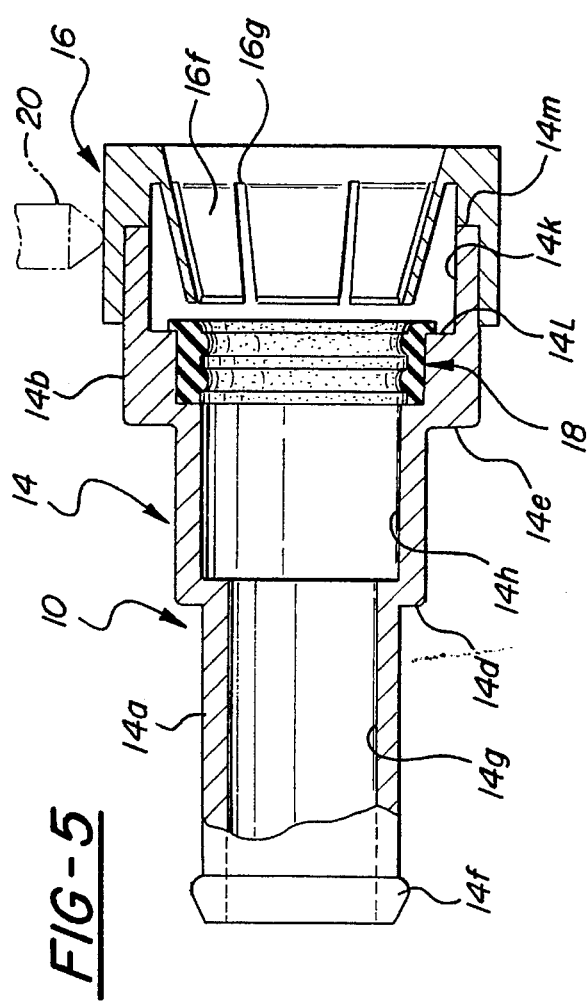
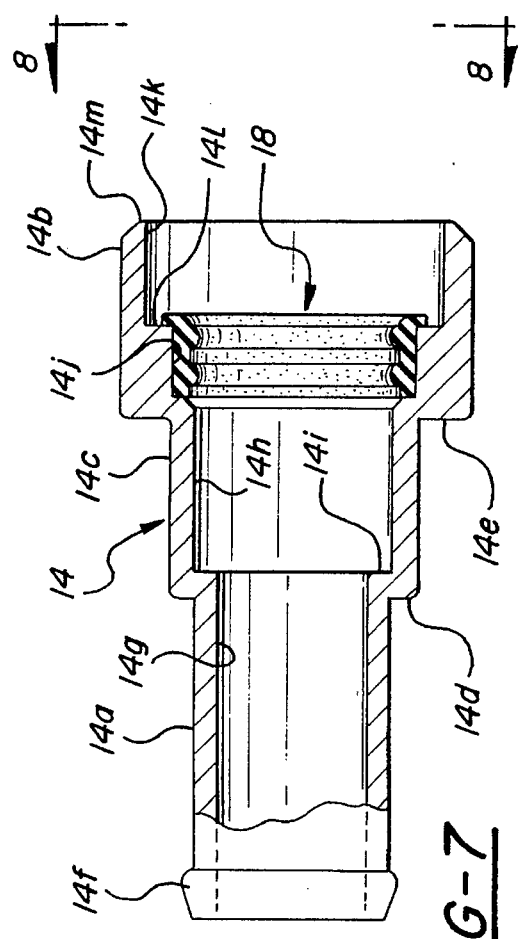

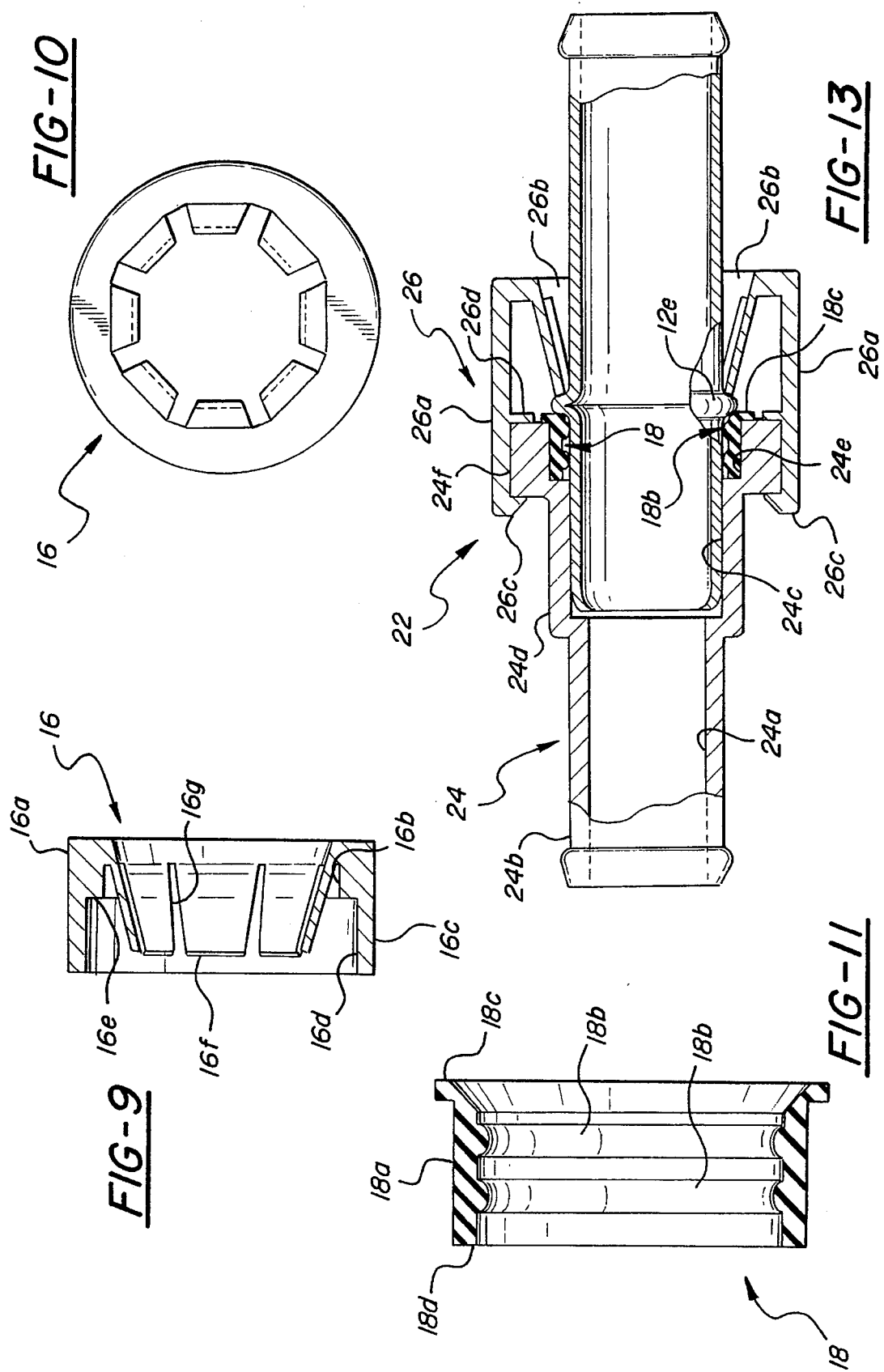

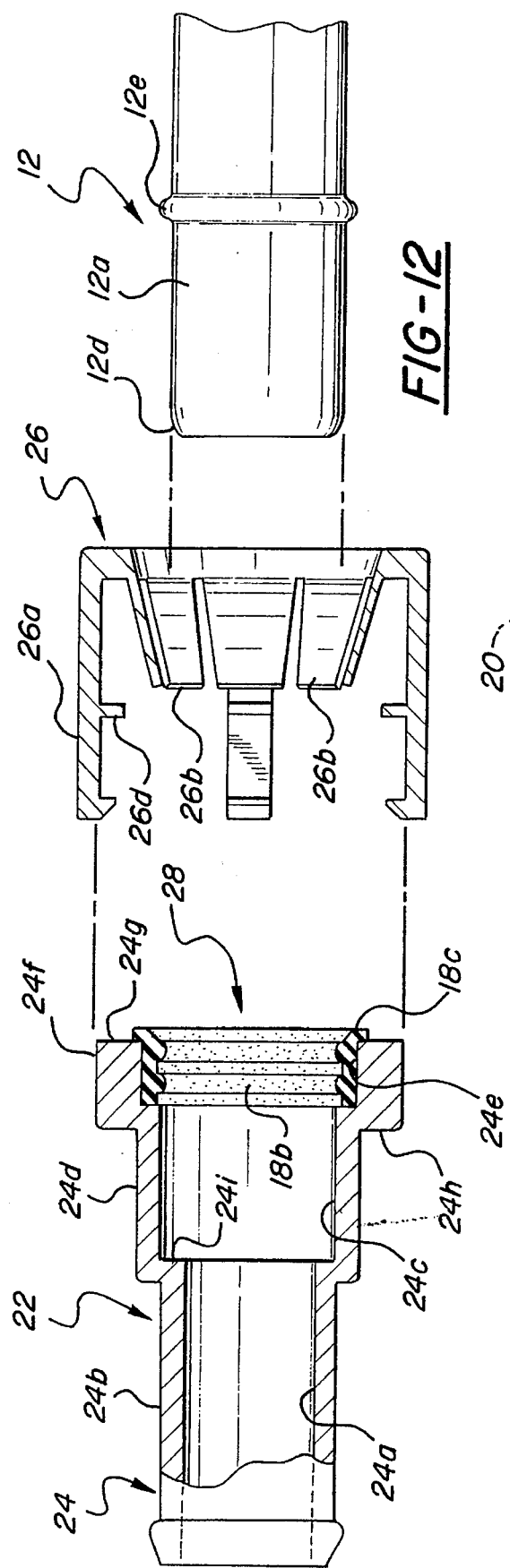
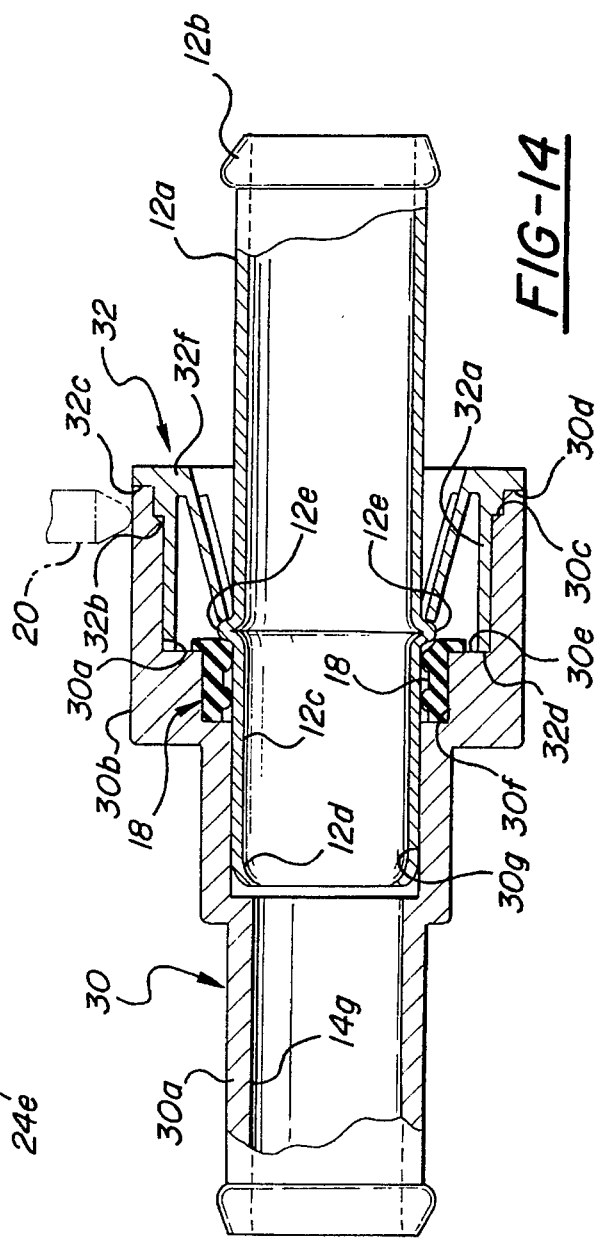

QUICK CONNECT COUPLING

REFERENCE TO RELATED APPLICATIONS

This application is a continuation-in-part of U.S. patent application Ser. No. 08/142,764 filed on Oct. 26, 1993.

FIELD OF THE INVENTION

This invention relates to a quick connect coupling for readily releasably connecting tubing elements.

BACKGROUND OF THE INVENTION

In systems utilizing conduits for transporting fluids, it is both necessary and desirable to provide for the rapid connection and disconnection of sections of such conduits. A good example is the hydraulic system of a motor vehicle which incorporates a large number of both rigid and flexible tubing elements which must reliably convey hydraulic fluid under pressure to ensure effective operation of the automobiles brakes.

Quick connectors for this type of tubing are well known. U.S. Pat. No. 3,584,902 issued to Vysa teaches the interconnection of tubing elements utilizing a removable spring clip assembly. Traditionally quick disconnect assemblies have utilizing an internal locking element which engages both a male member and female member, as is shown by U.S. Pat. No. 3,569,903 issued to Brishka. These quick disconnect devices typically incorporate one or more O-ring seals such as those found in U.S. Pat. Nos. 4,601,497 and 4,915,136 issued to Bartholomew.

All the foregoing devices have inherent limitations both in the security of their engagement systems, the complexity of their construction, and the reliability of their seals.

SUMMARY OF THE INVENTION

This invention is directed to the provision of an improved quick connect coupling.

More specifically, this invention is directed to the provision of the quick connect coupling having an improved sealing arrangement, having an improved locking arrangement, and embodying a simple and improved methodology for constructing the coupling.

The invention coupling is of the type comprising a tubular male member and a tubular female member sized to telescopically receive the tubular male member.

According to an important feature of the invention, the tubular male member defines a latching means on its exterior periphery, the tubular female member includes a first tubular piece defining a bore sized to telescopically receive the tubular male member and a second tubular piece connected to the first tubular piece and defining latching means for releasable latching coaction with the male member latching means in response to insertion of the male member within the female member; and the pieces are formed of plastic and are connected by fusion bonding. This arrangement allows the simple and inexpensive construction of the tubular female member.

According to a further feature of the invention, the female member comprises a first tubular piece having a forward end and a rearward end and a second tubular piece having a forward end and a rearward end. The first tubular piece defines a capture bore sized to receive the male member and a seal counterbore forwardly of the capture bore sized to receive an annular seal. The second tubular piece includes a rear annular mounting portion adapted to be received telescopically with respect to the forward end of the first piece and a plurality of radially inwardly angled circumferentially spaced forward latch portions for coaction with latch means on the male member. This two piece construction of the female member provides an effective female member that may be inexpensively manufactured In one disclosed embodiment of the invention the first and second pieces of the female member are formed of plastic material and the pieces are permanently bonded together with the bonding preferably being carried out utilizing a sonic welding procedure, and in another embodiment the pieces are snappingly connected together.

According to a further feature of the invention, the annular seal positioned on the seal counterbore comprises a single piece elastomeric member defining a series of axially spaced radially inwardly extending annular seal ribs sealingly and slidably engaging the front end portion of the male connector member in response to insertion of the front end portion of the male connector member into the front end of the female member. This specific seal construction provides a seal that is extremely resistant to twisting, displacement, or cutting of the seal in response to insertion of the male member into the female member.

According to a further feature of the invention, the first piece defines a forward annular edge in surrounding relation to the seal counterbore and the second piece defines a rearwardly facing annular edge for abutting coaction with the forward annular edge of the first piece. This arrangement allows the pieces to be readily assembled and ensures the proper axially positioning of the second piece relative to the first piece.

According to a further feature of the invention, the coupling comprises a tubular male connector member including a front end portion and an external annular bead defined at the rear end of the front end portion; a tubular female connector member having a front end adapted to receive the front end portion of the tubular male connector member and defining a capture bore sized to receive the front end portion of the tubular male connector member, a seal counterbore positioned forwardly of the capture bore, and circumferentially spaced resilient prong means for latching coaction with the rear annular face of the annular bead of the tubular male connector member in response to insertion of the front end portion of the male connector member into the front end of the female member and into the capture bore; and an annular seal positioned in the seal counterbore, including annular internal seal ribs sealingly and slidably engaging the front end portion of the male connector member, and including an annular front end portion sealingly engaging the front annular face of the annular bead of the male connector member with the members in their coupled relation. This specific coupling construction maximizes the sealing action of the coupling and minimizes play in the coupling.

The invention also provides an improved method for forming the female member of a quick connect coupling of the type comprising a tubular male member and a tubular female member sized to telescopically receive the tubular male member. According to the invention methodology, a first tubular piece is formed having a bore sized to receive the male member; a second tubular piece is formed defining latching means adapted to coact with latching means on the male member to releasably couple the members together; and the first and second pieces are permanently bonded together to form the female member. This methodology provides a ready and inexpensive means of providing an effective female member of a quick connect coupling.

According to a further feature of the invention methodology, the tubular female member is formed by configuring a tubular housing to define a front housing end, a central capture bore sized to receive the front end portion of the male member, and a counterbore positioned forwardly of the central bore, and an elastomeric material is molded into the counterbore to define an annular sealing means for sliding sealing coaction with the front end portion 6f the male member as the front end portion is inserted into the front end of the housing and into the central capture bore, According to a further feature of the invention methodology, the tubular male member includes retainer means and the method includes the further steps of molding a retainer cap including retainer means for latching coaction with the male member retainer means and connecting the retainer cap to the housing.

In one embodiment of the invention the retainer cap is connected to the housing in a sonic welding procedure and in another embodiment the retainer cap is snappingly connected to the housing.

BRIEF DESCRIPTION OF THE DRAWINGS

FIG. 5 is a cross-sectional view of a female member employed in the invention quick connect coupling;

FIG. 6 is an end view of the female member;

FIG. 7 is a cross-sectional view of a first piece utilized to form the female member;

FIG. 8 is a end view of the first piece of FIG. 5;

FIG. 9 is a cross-sectional view of a second piece utilized to form the female member;

FIG. 10 is an end view of the second piece of FIG. 8;

FIG. 11 is a cross-sectional view of a seal utilized in the female member;

FIG. 12 is an exploded cross-sectional view of an alternate form of quick connect coupling;

FIG. 13 is a cross-sectional view of the quick connect coupling of FIG. 12 shown in a coupled relation;

FIG. 14 is a cross-sectional view of a further alternate for of quick connect coupling;

DETAILED DESCRIPTION OF THE PREFERRED EMBODIMENTS

Figure 1:
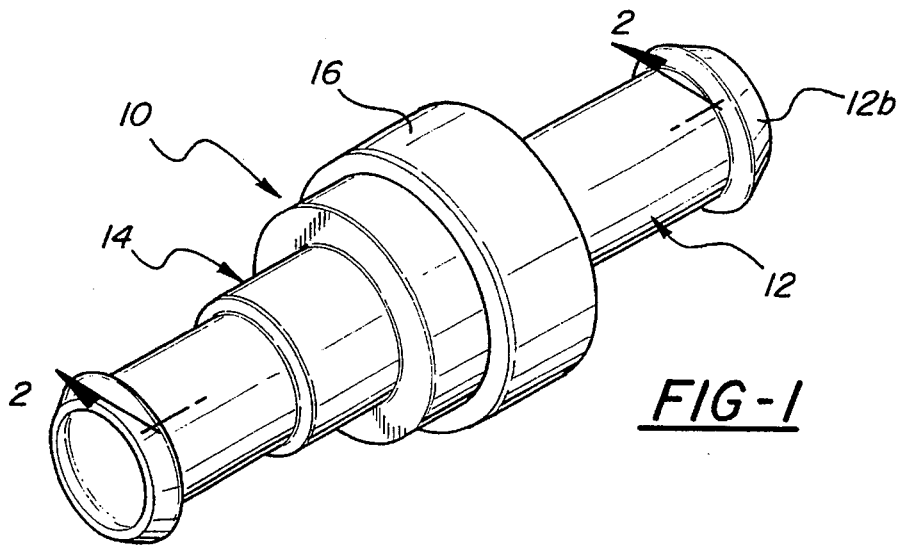
FIG. 1 is a perspective view of a quick connect coupling according to the invention.
Figure 2:
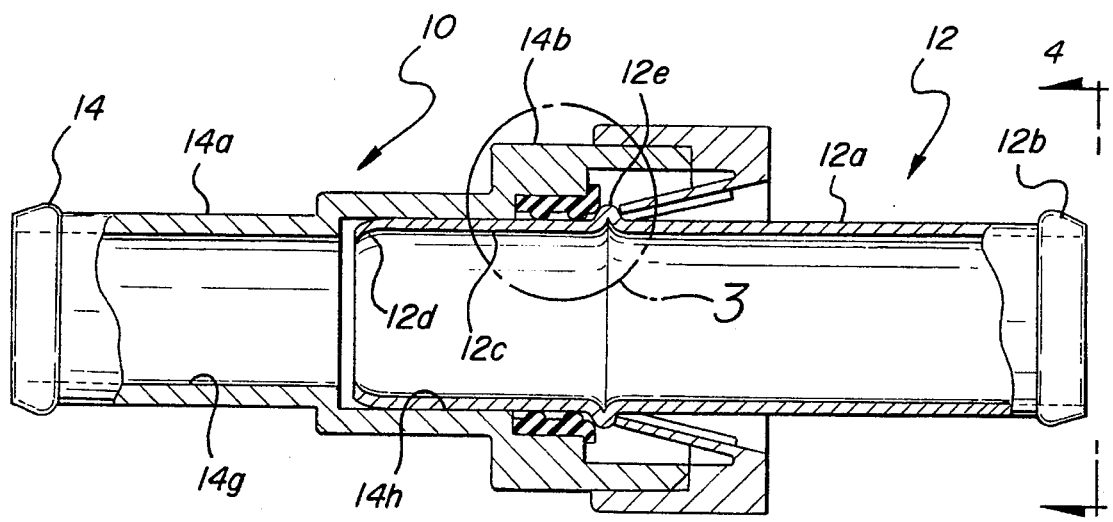
FIG. 2 is a cross-sectional view taken on line 2—2 of FIG. 1.
Figure 3:
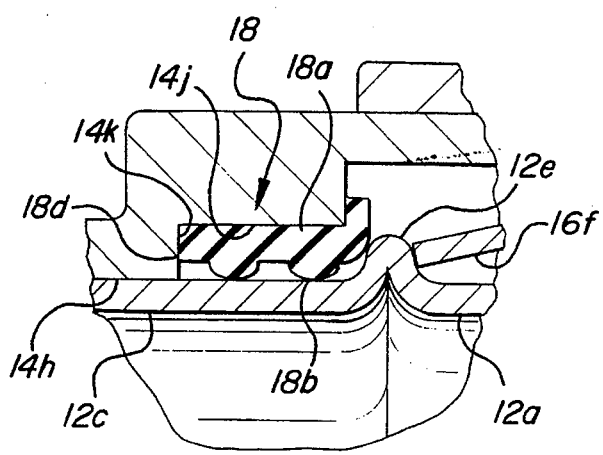
FIG. 3 is a detail view taken within the circle 3 of FIG. 3.
Figure 4:
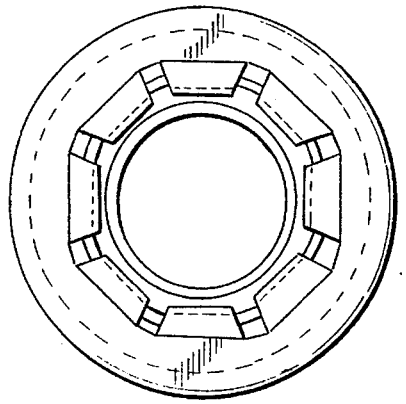
FIG. 4 is an end view looking in the direction of the arrow 4 in FIG. 2.

The invention quick connect coupling seen in FIGS. 1–11, broadly considered, includes a female connector member 10 and a male connector member 12. It will be understood that the female connector member 10 and male connector member 12 are adapted to be suitably secured to tubing elements and that the male and female connector members are operative in response to insertion of the male member into the female member to releasably connect the male member to the female member and form a continuous fluid passage through the coupling to establish fluid communication between the tubing elements associated with the connector members.

Male connector member 12 is formed of a suitable ferrous material and includes a main body tubular portion 12a, a connector flange 12b at the rear end of the member for connection with an associated tubing element, a front end tubular portion 12c terminating in a tapered front edge 12d, and an annular external bead 12e constituting a latching or retaining means for the quick connect coupling.

Female connector member 10 comprises a three part assembly including a tubular housing 14, an annular retainer cap 16, and an annular elastomeric seal 18.

Housing 14 is formed of a suitable plastic material, such for example as Dupont 70G33, in an injection molding operation. Housing 14 has a stepped configuration and includes a relatively small diameter rear end portion 14a, a relatively large diameter front end portion 14b, and an intermediate portion 14c having a diameter intermediate the diameters of portions 14a and 14b. Rear end portion 14a forms an annular external shoulder 14d with intermediate portion 14c and intermediate portion 14c forms an annular external shoulder 14e with front end portion 14b.

Rear end portion 14a includes a connector flange portion 14f for connection with an associated tubing element and defines a central bore 14g. Intermediate portion 14c defines a central capture bore 14h which constitutes a counterbore with respect to bore 14g and forms an annular internal shoulder 14i with bore 14g. Front end portion 14g defines a seal bore 14j, constituting a counterbore with respect to bore 14h and coacting with bore 14h to form an annular internal shoulder 14k, and a sleeve bore 14k constituting a counterbore with respect to bore 14j and coacting with bore 14j to form an annular internal shoulder 14l.

Retainer cap 16 is formed of a suitable plastic material (such for example as Dupont 70G33) in a suitable injection molding operation and includes a main body or forward annular portion 16a defining a central bore 16b having a diameter corresponding generally to the diameter counterbore 14k of housing 14; a rear or rim portion 16c defining a central bore 16d having a diameter corresponding generally to the outer diameter of housing front end portion 14b and coacting with bore 16b to define an annular shoulder 16e; and a plurality of circumferentially spaced prong or retainer portions 16f extending radially inwardly and rearwardly from main body portion 16a with each prong portion 16f separated from the adjacent prong portions by slits 16g which allow the prongs to flex individually in cantilever fashion with respect to main body portion 16a.

Seal 18 has an annular configuration and is formed of a suitable elastomeric material. Seal 18 includes an annular main body portion 18a having a diameter corresponding generally to the diameter of counterbore 14j of housing 14 and an axial length corresponding generally to the axial length of counterbore 14j. Seal 18 further includes a plurality of radially inwardly extending axially spaced annular ribs or ridges 18b, and a radially outwardly extending flange portion 18c proximate the front end of the seal.

Female member 10 is formed by injection molding housing 14; molding seal 18 in place within counterbore 14j utilizing a pressurized molding procedure in which the material of the seal is injected under pressure into counterbore 14j in molten form and allowed to cure within the counterbore; injection molding retainer cap 16; positioning retainer cap 16 over main body portion 14b of housing 14 with retainer cap bore 16d positioned telescopically over the outer periphery of housing front end portion 14b and with annular shoulder 16e in abutting engagement with the front annular edge 14m of housing 14; and permanently bonding the retainer cap to the housing utilizing a sonic welding technique in which a sonic horn 20 is positioned against the outer periphery of retainer cap 16 and sonic vibrations are transmitted through the retainer cap to the interface between retainer cap bore 16d and the outer periphery of housing front end portion 14b and the interface between annular edge 14f and shoulder 16e so as to cause these interfaces to undergo relative vibration in known manner to heat the plastic material at the interfaces and cause the plastic material to fuse together to permanently bond the retainer cap to the housing at the interfaces.

In order to ensure permanent bonding of the seal 18 to housing 14, an adhesive film is applied to seal bore 14j prior to injection of the molten elastomeric material. In the final disposition of the seal within the housing, the outer peripheral surface of seal main body portion 18a is permanently bonded to the cylindrical surface of seal bore 14j, seal flange portion 18c is positioned against housing shoulder 14l, and the rear annular edge 18d of seal main body portion 18a is positioned against housing shoulder 14k.

Female connector member 14 is now ready for receipt of male member 12. Specifically, the male and female connector members are releasably coupled together by inserting front end 12c of male connector member 12 into the open forward end of female connector member 14 to position male member front end portion 12c within female member capture bore 14h with the outer periphery of the front end portion in sealing engagement with seal ribs 18b. It will be understood that as the male member front end portion 12c enters the capture bore 14h, retainer bead 12e moves within prong portions 16f of the retainer cap to flex the prong portions radially outwardly in cantilever fashion until the bead moves axially beyond the free ends of the outwardly flexed prong portions, whereafter the prong portions snap back radially inwardly to capture the retainer bead and couple the male and female members together. It will be seen that as the male member front end portion is inserted into the seal, the unitary multi-rib construction of the seal acts to prevent twisting, displacement, or cutting of the seal such as often occurs with seals of the well-known O-ring type.

In the coupled relation of the male and female connector members the free ends of the prong portions 16f engage the rear annular face of the retainer bead 12e, the front annular face of the retainer bead is positioned against flange portion 18c of seal 18, and the leading end edge 12d of the male member is positioned against housing shoulder 14i so as to substantially eliminate any slop or play in the coupling. The coupling may be released in known manner by sliding a release tool or collar along the main body portion 12a of male element 12 to force prong portions 16f radially outwardly to a position clear of retainer B 12e whereafter the male and female members may be readily axially separated.

In the alternate form of the invention quick connect coupling shown in FIGS. 11 and 12, male connector member 12 is identical to male connector member 12 of the FIGS. 1–10 embodiment and female connector member 22 is similar to the female connector member of the FIGS. 1–10 embodiment to the extent that it involves a two piece construction and involves an elastomeric seal 18 molded in place within a seal bore of the female connector member. Specifically, female connector member 22 includes a housing 24 formed of a suitable ferrous material, a retainer cap 26 formed of a suitable plastic material, and a seal 18 formed of a suitable elastomeric material. Housing 24 includes a bore 28a formed within a rear housing portion 24b, a capture counterbore 24c formed within an intermediate housing portion 24d, and a seal counterbore 24e formed within a-front housing portion 24f and opening in the front end of the housing. Annular seal 18 is molded in place within seal bore 24c in the manner described with reference to the FIGS. 1–11 embodiment so that the seal is permanently bonded to the cylindrical surface of seal bore 24e.

Retainer cap 26 is formed in an injection molding process, is designed to be snappingly positioned over the housing 24, and includes a plurality of circumferentially spaced axially extending finger portions 26a and a plurality of circumferentially spaced radially inwardly and rearwardly extending prong portions 26b. Each finger portion 26a includes a rear hook portion 26c and a radially inwardly extending tab portion 26d.

The female connector member 22 is formed by suitably fabricating housing 24; molding seal 18 in place within bore 24e with the main body portion of the seal permanently bonded to the cylindrical surface of bore 24e and seal flange portion 18c positioned against the front annular end edge 24g of the housing; and sliding retainer cap 26 over the front housing end portion 24f to allow the finger portions 26a to flex outwardly and move axially along the outer periphery of housing front portion 24f until the hook portions 26c clear the annular shoulder 24h between housing front portion 24f and housing intermediate portion 24d at which time the fingers snap radially inwardly to move the hook portions 26c into locking engagement with the shoulder 24h and the tab portions 26c move into abutting engagement with the front annular end edge 24g of the housing to snappingly and fixedly secure retainer cap 26 to housing 24. Note that tab portions 26d move into positions in axial alignment with and surrounding the annular flange portion 18c of seal 1i and effectively form radial extensions of the seal flange portion.

Female connector member 22 is now ready for receipt of male connector member 12. Specifically, the male and female connector members are releasably coupled together by inserting front end 12c of male connector member 12 into the open forward end of female connector member 22 to position male member front end portion 12c within female member capture bore 24c with the outer periphery of the front end portion in sealing engagement with the annular ribs 18b of seal 18. It will be understood that as the male member front end portion 12c enters the forward end of the female connector member, retainer bead 12e moves within prong portions 26b of the retainer cap to flex the prong portions radially outwardly in cantilever fashion until the bead moves axially beyond the free ends of the outwardly flexed prong portions whereafter the prong portions snap back radially inwardly to capture the retainer bead and couple the male and female members together. In the coupled relation of the male and female connector members, the free ends of the prong portions 26b engage the rear annular face of the retainer bead 12e, the front annular face of the retainer bead is positioned sealingly against the seal annular flange portion 18c, and the leading end edge 12d of the male member is positioned against housing shoulder 24c to minimize slop or play in the coupling. The coupling may be released in known manner by sliding a released tool or collar along the main body portion 12a of male element 12 to force prong portions 26b radially outwardly to a position clear of retainer bead 12e whereafter the male and female members may be readily axially separated.

The quick connect coupling seen in FIG. 14 is generally similar to the coupling of FIGS. 1–11 with the exception that the retainer cap, rather than being received telescopically over the tubular housing of the female connector member, is received telescopically within the tubular housing of the female connector member. Specifically, the retainer cap 32 of the FIG. 14 embodiment includes a rearward rim or sleeve portion 32a which is sized to fit telescopically within a bore 30a formed in the forward end portion 30b of the tubular housing 30 of the FIG. 14 embodiment. Retainer cap 32 further defines first and second annular shoulders 32b and 32c concentric with and positioned radially outwardly of sleeve 32a. Shoulders 32b and 32c respectively coact with concentric annular shoulders 30c and 30d formed at the forward end of housing 30 to define the extent of insertion of retainer cap 32 into the front end of the housing member. The extent of insertion of the retainer cap is further defined by engagement of the rear annular edge 32d of the retainer cap with the annular shoulder 30e formed between sleeve bore 30a and seal bore 30f. Retainer 32 further includes a plurality of circumferentially spaced prong or retainer portions 32e extending radially inwardly and rearwardly from the main body portion 32f of the retainer cap and coacting with the bead 12e of the male member, in the manner previously described with respect to the FIGS. 1–11 embodiment, to engage the rear annular face of the beard in response to insertion of the male member into the capture bore 30g of the tubular housing to releasably maintain the male and female members in coupled relation.

Retainer cap 32 is fixedly secured to housing 30 utilizing a sonic welding technique in which sonic horn 20 is positioned against the outer periphery of the tubular housing and sonic vibrations are transmitted through the tubular housing to the interface between the sleeve 32a of the retainer cap and the tubular housing forward end portion 30b, as well as to the interfaces between the annular surfaces 32d, 32b and 32c of the retainer cap and the confronting annular surfaces 30e, 30c and 30d of the tubular housing so as to cause these interfaces to undergo relative vibration in known manner to heat the plastic material at the interfaces and cause the plastic material to fuse together to permanently bond the retainer cap to the housing at the interfaces.

Figure 15:
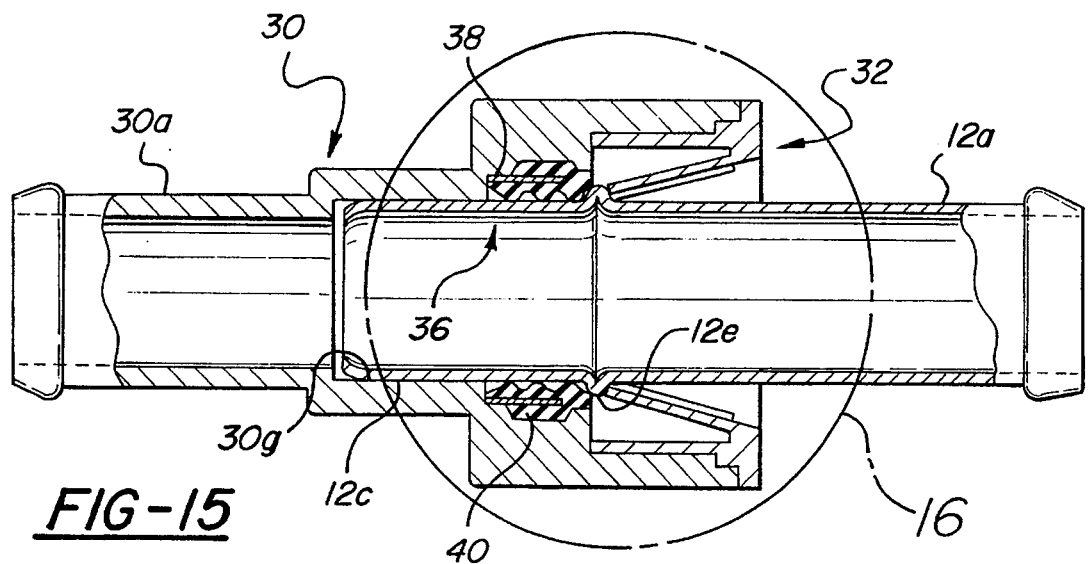
FIG. 15 is a cross-sectional view of a yet further alternate form of quick connect coupling.
Figure 16:
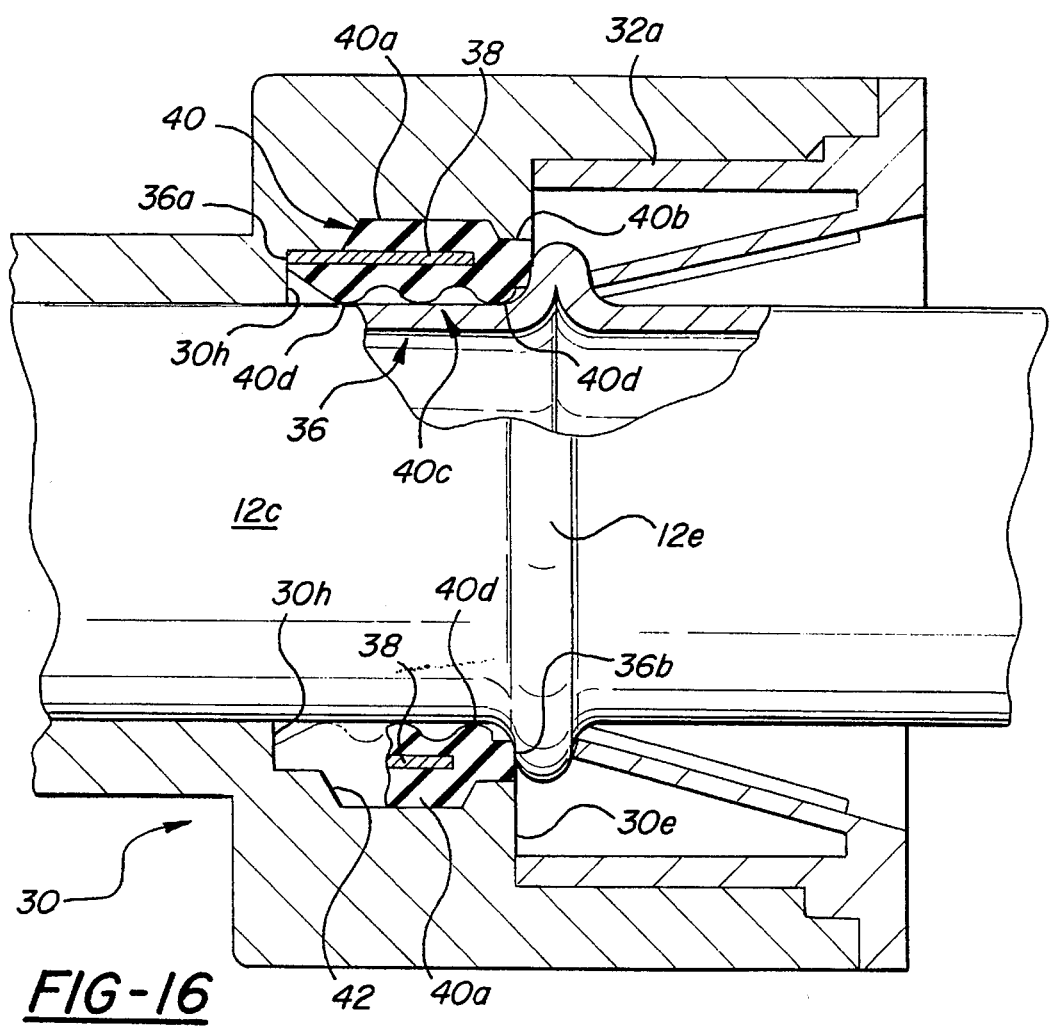
FIG. 16 is an enlarged view taken within the circle 16 of FIG. 15.

The quick connect coupling seen in FIGS. 15 and 16 is generally similar to the quick connect coupling of FIG. 14 with the exception that the seal is a composite structure and is snap-fitted into the seal counterbore rather than being molded in place in the counterbore.

Specifically, seal 36 comprises a steel ring 38 and an annular elastomeric member 40 molded around the steel ring to form the composite seal structure. Elastomeric member 40 includes an outboard ridge portion 40a, a front nose portion 40b, and an inboard portion 40c. Inboard portion 40c is configured to define a series of axially spaced, radially inwardly extending annular seal ribs 40d for sealing, sliding engagement with the front end portion 12c of male connector member 12.

The seal counterbore 42 provided in housing member 30 has a cross-sectional configuration matching the cross-sectional configuration of the outboard profile of the seal 36 so that the seal may be inserted into the seal counterbore by flexing the seal, inserting the seal into the seal counterbore, and allowing the seal to snap outwardly into contiguous seating engagement with seal counterbore 42 with the coaction of seal outboard ridge portion 40a and seal counterbore 42 precluding axial displacement of the seal out of the counterbore.

In the assembled relation of the male and female connector members, seal 36 is positioned in seal counterbore 42 with the rearward annular edge 36a of the seal seated against housing shoulder 30h, the front annular edge 36b of the seal positioned generally flush with housing shoulder 30e and against the forward annular face of retainer bead 12e, and the annular seal ribs 40d sealingly and slidably engaging male connector member front end portion 12c.

It will be seen that the invention provides a quick connect coupling having important advantages over the prior art. Specifically, the invention quick connect coupling provides a seal that is extremely effective and durable, that resists twisting, displacement, and cutting, and that allows tailoring of the sealing characteristics and performance to suit a wide variety of sealing applications. Further, the invention quick connect coupling provides an improved locking arrangement that is external to the coupling and that does not interfere with the sealing action of the invention seal. Further, the invention quick connect coupling provides a construction that is extremely effective and yet extremely simply and inexpensive.

Whereas preferred embodiments of the invention has been illustrated and described in detail it will be apparent that various changes may be made in the disclosed embodiment without departing from the scope or spirit of the invention.

We claim:

1. A quick connector coupling comprising:

a tubular male connector member including a front end portion and an external annular bead defined at the rear end of the front end portion;

a tubular female connector member having a front end adapted to receive the front end portion of the tubular male connector member and defining a capture bore sized to receive the front end portion of the tubular male connector member, a seal counterbore positioned forwardly of the capture bore, and circumferentially spaced resilient prong means for latching coaction with the rear annular face of the annular bead of the tubular male connector member in response to insertion of the front end portion of the male connector member into the front end of the female member and into the capture bore;

an annular seal positioned in the seal counterbore and including a plurality of successive axially spaced annular internal seal ribs sealingly and slidably engaging the front end portion of the male connector member;

the tubular female connector member including a first tubular piece defining the capture bore and the seal counterbore and a second tubular piece connected to the first tubular piece and defining the resilient prong means;

the first and second pieces being formed of a plastic material and being connected by fusion bonding.

2. A quick connect coupling according to claim 1 wherein the seal is molded in place in the seal counterbore.

3. A quick connect coupling for tubing comprising a tubular male connector member having a forward pilot portion and a tubular female connector member sized to telescopically receive the pilot portion of the tubular male connector member, characterized in that:

latching means are defined on the exterior periphery of the tubular male connector member rearwardly of the pilot portion;

the tubular female connector member includes a first tubular piece defining a capture bore sized to telescopically receive the pilot portion of the tubular male member and a seal counterbore positioned forwardly of the capture bore, and a second tubular piece connected to the first tubular piece and defining latching means for releasable latching coaction with the male connector member latching means in response to insertion of the male connector member into the female connector member;

the pieces are formed of plastic material and are connected by fusion bonding; and the coupling further includes an annular elastomeric seal positioned in the seal counterbore and including a plurality of successive axially spaced annular internal seal ribs sealingly and slidably engaging the male member pilot portion in response to insertion of the pilot portion into the capture bore.

4. A quick connect coupling according to claim 3 wherein the fusion bonding comprises sonic welding.

5. A female connector member for use in a quick connect coupling comprising the female connector member and a male connector member adapted to be received telescopically within the female connector member, characterized in that:

the female connector member comprises
  a first tubular piece having a forward end and a rearward end and defining a capture bore sized to receive the male member and a seal counterbore positioned forwardly of the capture bore sized to receive an annular seal;
  a second tubular piece having a forward end and a rearward end and including a rear annular mounting portion adapted to be received telescopically with respect to the forward end of the first piece and a plurality of radially inwardly angled, circumferentially spaced forward latch portions for coaction with latch means on the male member;

the latch portions are formed integrally and homogeneously with the rear mounting portion; and the seal comprises an annular elastomeric seal including a plurality of successive axially spaced annular internal sealing ribs sealingly and slidably engaging the male connector member.

6. A female connector member according to claim 5 wherein:

the first and second pieces of the female connector member are formed of plastic material and the pieces are permanently bonded together.

7. A female connector member according to claim 6 wherein:

the bonding comprises fusion bonding utilizing sonic welding.

8. A quick connect coupling according to claim 5 wherein:

the first piece defines a further sleeve counterbore proximate the forward end of the piece and a forward annular edge in surrounding relation to the sleeve counterbore and;

the second piece defines a rearwardly facing annular edge for abutting coaction with the forward annular edge of the first piece.

9. A quick connect coupling according to claim 5 wherein:

the first piece further defines a bore rearwardly of the capture bore having a diameter less than the diameter of the capture bore and coacting with the capture bore to define an annular shoulder operative to delimit the axial insertion of the male connector member into the female connector member.

10. A quick connect coupling comprising:

a tubular male connector member including a front end pilot portion and latch means rearwardly of the pilot portion;

a tubular female connector member assembly having a front adapted to receive the pilot portion of the tubular male connector member and defining a capture bore sized to accommodate the pilot portion of the tubular male connector member, and a seal counterbore positioned forwardly of the capture bore; and an annular seal positioned in the seal counterbore and comprising a single piece elastomeric member defining a series of axially spaced radially inwardly extending annular seal ribs sealingly and slidably engaging the pilot portion of the male connector member in response to insertion of the pilot portion of the male connector member into the front end of the female connector member;

the female connector member assembly comprising first and second tubular pieces;

the first tubular piece defining the capture bore and the seal counterbore;

the second tubular piece including a generally cylindrical rear mounting portion for securement to the front end of the first tubular piece and a plurality of circumferentially spaced latch finger portions extending rearwardly and radially inwardly from the front end of the cylindrical mounting portion of the second piece for coaction with the male connector latch means;

the latch finger portions being formed integrally and homogeneously with respect to the rear mounting portion.

11. A quick connect coupling according to claim 10 wherein the pieces are snappingly secured together.

12. A quick connect coupling according to claim 10 wherein the seal is molded in place in the seal counterbore.

13. A quick connect coupling according to claim 10 wherein the seal is snap-fitted into the seal counterbore.

14. A method of providing the female connector member of a quick connect coupling of the type comprising a tubular male connector member and a tubular female connector member sized to telescopically receive the tubular male connector member, said method comprising:

forming a first tubular piece having a bore extending completely through said first tubular piece and sized to receive the male connector member;

forming a second tubular piece defining a mounting portion for connection to the first tubular piece and latching means formed integrally and homogeneously with the mounting portion and extending into said bore adapted to coact with latching means on the male connector member to releasably couple the members together; and permanently bonding the second piece to the first piece to form the female connector member.

15. A method according to claim 14 wherein:

the permanent bonding comprises sonic welding.

16. A method according to claim 14 wherein:

the first and second pieces are formed of a plastic material.

17. A method according to claim 16 wherein:

the permanent bonding comprises sonic welding.

18. A method according to claim 14 and including the further steps of:

forming a seal bore in said first tubular piece constituting a counterbore with respect to the bore; and molding an elastomeric seal into said counterbore.

19. A quick connector coupling comprising:

a tubular male connector member including a front end portion and an external annular bead defined at the rear end of the front end portion;

a tubular female connector member having a front end adapted to receive the front end portion of the tubular male connector member and defining a capture bore sized to receive the front end portion of the tubular male connector member, a seal counterbore positioned forwardly of the capture bore, and circumferentially spaced resilient prong means for latching coaction with the rear annular face of the annular bead of the tubular male connector member in response to insertion of the front end portion of the male connector member into the front end of the female member and into the capture bore;

an annular seal positioned in the seal counterbore, including annular internal seal ribs sealingly and slidably engaging the front end portion of the male connector member, and including an annular front end portion sealingly engaging the front annular face of the annular bead of the male connector member with the members in their coupled relation;

the tubular female connector member including a first tubular piece defining the capture bore and the sealed counterbore and a second tubular piece connected to the first tubular piece and defining the resilient prong means;

the first and second pieces being formed of a plastic material and being connected by fusion bonding.

20. A quick connection coupling according to claim 19 wherein the fusion bonding comprises sonic welding.

21. A quick connector coupling comprising:

a tubular male connector member including a front end portion and an external annular bead defined at the rear end of the front end portion;

a tubular female connector member having a front end adapted to receive the front end portion of the tubular male connector member and defining a capture bore sized to receive the front end portion of the tubular male connector member, a seal counterbore positioned forwardly of the capture bore, and circumferentially spaced resilient prong means for latching coaction with the rear annular face of the annular bead of the tubular male connector member in response to insertion of the front end portion of the male connector member into the front end of the female member and into the capture bore; and an annular seal positioned in the seal counterbore, including annular internal seal ribs sealingly and slidably engaging the front end portion of the male connector member, and including an annular front end portion sealingly engaging the front annular face of the annular bead of the male connector member with the members in their coupled relation;

the annular front end portion of seal comprising an annular flange portion extending outwardly from the main body of the seal.

22. A method of forming the tubular female connector member of a quick connect coupling of the type including a tubular female connector member and a tubular male connector member having a front end portion adapted to be inserted into the front end of the tubular female connector member to form the coupling, characterized in that:

the tubular female connector member is formed by configuring a tubular housing to define a front housing end, a central capture bore sized to receive the front end portion of the male member, and a counterbore positioned forwardly of the central bore;

an elastomeric material is molded into the counterbore to define an annular sealing means for sliding sealing coaction with the front end portion of the male member as the front end portion is inserted into the front end of the housing and into the central capture bore.

the tubular male connector member includes retainer means; and the method includes the further steps of molding a retainer cap including retainer means for latching coaction with the male member retainer means, and connecting the retainer cap to the housing.

23. A method according to claim 22 wherein:

the step of connecting the retainer cap to the housing comprises fusion bonding the retainer cap to the housing.

24. A method according to claim 23 wherein:

the fusion bonding is accomplished in a sonic welding operation.

25. A method according to claim 22 wherein:

the step of connecting the retainer cap to the housing comprises snappingly positioning the retainer cap over the housing.

* * * * *